June 15, 1943.  I. F. JOHNSON  2,322,028
TEMPLATE
Filed July 1, 1941

Inventor
IRVIN F. JOHNSON.
By Frank Fraser
Attorney

Patented June 15, 1943

2,322,028

UNITED STATES PATENT OFFICE 2,322,028

TEMPLATE

Irvin F. Johnson, Toledo, Ohio, assignor to Libbey-Owens-Ford Glass Company, Toledo, Ohio, a corporation of Ohio Application July 1, 1941, Serial No. 400,638

8 Claims. (Cl. 33—174)

The present invention relates broadly to the art of glass cutting and more particularly to the cutting of curved lenses or other curved glass articles.

This invention is of especial utility in the cutting of concavo-convex lenses such as are used in goggles, gas masks and the like, but may also be employed in cutting lenses which are concave or double-convex as well as lenses of all kinds having curved surfaces. Likewise, while the invention is primarily adapted for the cutting of lenses from laminated safety glass, including two sheets of glass and an interposed layer of plastic material bonded together to provide a composite structure, it may also be utilized in the cutting of single sheets or plates of glass.

An object of the invention is to provide a device including a pattern or template for guiding the cutting tool and which may be readily and accurately positioned upon the glass to be cut and firmly secured thereto whereby the danger of clippage during the cutting operation and spoiling of the cut is minimized.

Another object of the invention is to provide a hand-manipulated device of the above character of compact, relatively simple, inexpensive construction which can be easily and quickly attached to the glass and removed therefrom by the operator.

A further object of the invention is to provide a hand-manipulated device of the above character which is adhered to the glass by suction and which can be rapidly and conveniently actuated by the operator to establish the required vacuum for holding the device in place during the cutting operation and for subsequently releasing the vacuum to remove the same after cutting.

A still further object of the invention is to provide a hand-manipulated device of the above character embodying a template or pattern for guiding the cutting tool and a suction cup carried thereby and serving to secure said template or pattern to the glass; said suction cup being provided with means which permits the operator to position the device and create the required holding vacuum in a single operation and which also permits the operator to release the vacuum and remove the device in a single operation.

Other objects and advantages of the invention will become more apparent during the course of the following description, when taken in connection with the accompanying drawing.

In the drawing, wherein like numerals are employed to designate like parts throughout the same:

Figure 1:
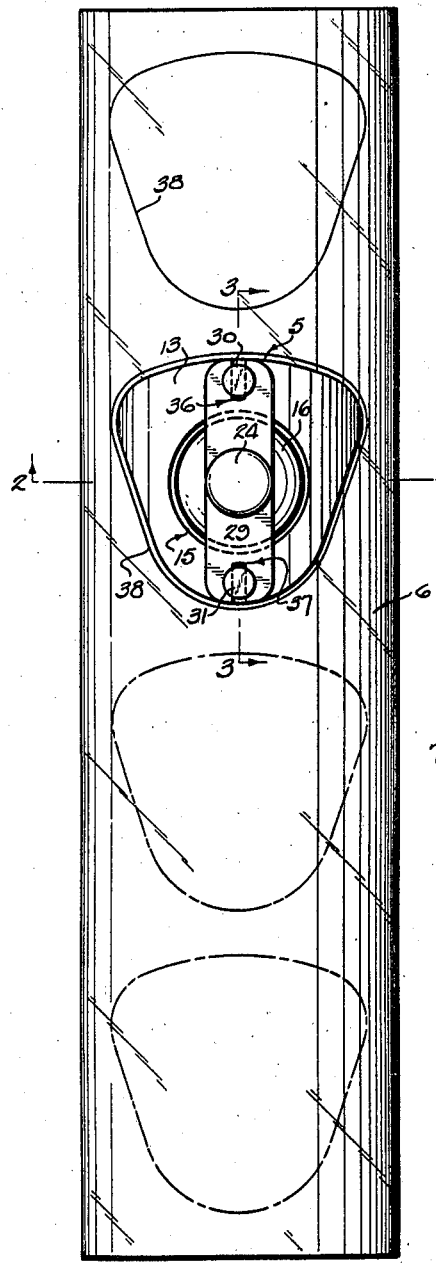
Fig. 1 is a plan view of a device constructed in accordance with the invention and associated with the convex surface of a concavo-convex sheet of laminated safety glass.
Figure 2:
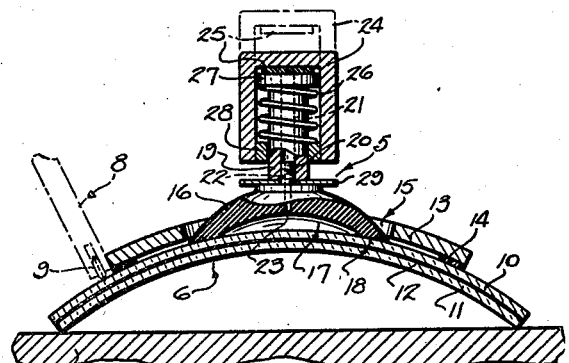
Fig. 2 is a transverse section through the device taken substantially on line 2—2 of Fig. 1.
Figure 3:
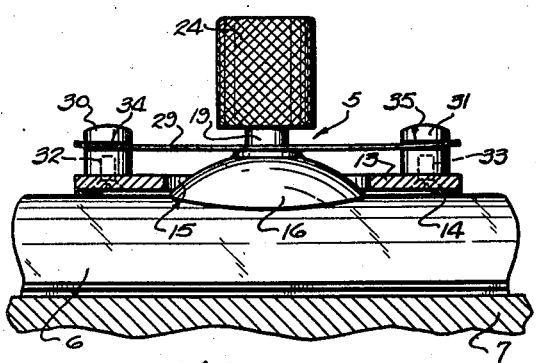
Fig. 3 is a longitudinal section through the device taken substantially on line 3—3 of Fig. 1.

With reference to the drawing and particularly to Figs. 1, 2 and 3, the improved device is designated in its entirety by the numeral 5 and is shown in association with the convex surface of a concavo-convex sheet of laminated safety glass 6 to be cut resting horizontally upon a suitable support 7. The cutting tool is indicated at 8 and includes the usual rotatable steel cutting wheel 9. The sheet of laminated safety glass 6 comprises the two curved sheets of glass 10 and 11 having interposed therebetween a layer of plastic material bonded to the glass sheets to form a composite structure.

The device 5 comprises a template or pattern 13 having the desired outline and transversely curved to correspond substantially to the curvature of the convex surface of the laminated sheet 6 to be cut. The template or pattern 13 is preferably provided upon its bottom surface with a gasket 14 engaging the glass surface and is further provided approximately centrally thereof with a circular opening 15. Received within said opening 15 is a suction cup 16 preferably formed of rubber or similar resilient material and being provided with an interior space or chamber 17. The edge portion of the suction cup is preferably flattened as at 18 to provide a relatively wide seat for engagement with the surface of the laminated sheet.

Secured to the suction cup 16 centrally thereof is a vertical stem 19 threaded upon a screw 20 fixed to said cup. The stem 19 is provided with an opening 21 extending longitudinally therethrough and open at its outer end to the atmosphere, said opening 21 communicating at its inner end with the interior 17 of suction cup 16 through the aligned passages 22 and 23 formed in the screw 20 and cup 16 respectively.

Slidably carried upon the stem 19 is a cap 24 and secured to the inner surface of the top of said cap is a pad 25, preferably of rubber or other resilient material and serving to close the outer end of the opening 21 in stem 19 when the cap is in full line position shown in Fig. 2. Encircling the stem 19 is a compression spring 26 bearing at one end against a circumferential flange 27 provided at the outer end of the stem and at its opposite end against a ring 28 fixed to the inside of the cap 24 at the inner end thereof. The principal function of the spring 26 is to prevent complete removal of the cap 24 from the stem 19 upon outward movement thereof.

The template or pattern 13 and suction cup 16 are connected together in the following manner. Thus, there is carried by the suction cup 16 a strap 29 of relatively thin spring metal having an opening therein intermediate its ends through which the screw 20 is received so that upon threading of the stem 19 upon said screw the strap 29 will be firmly clamped between the said stem and the vacuum cup. Provided at the opposite ends of the template 13 are pins 30 and 31 secured to said template by screws 32 and 33 respectively and having flattened portions 34 and 35 adjacent the outer ends thereof. The metal strap 29 is provided at its opposite ends with open slots 36 and 37 which receive the flattened portions 34 and 35 of the pins 30 and 31 therein.

In operation, the device 5 is placed upon the laminated sheet 6 and the cap 24 pushed inwardly toward the sheet to flex the suction cup 16 in a manner to expel the air from the interior 17 thereof and upon release of the pressure upon the cap, the cup will firmly grip the sheet due to the vacuum that has been formed in the interior of said cup. The inward movement of the cap 24 will cause the pad 25 to close the outer end of the opening 21 in stem 19 so that upon release of the cap it will be held closed by atmospheric pressure, thereby shutting off communication between the interior of the cup and the atmosphere.

When the device is firmly adhered to the glass, the operator draws the cutting tool 8 around the edge of the template or pattern 13 to score the glass sheet 10 along the desired line as indicated at 38. After the cutting operation, the operator simply pulls outwardly on the cap 24 which will again place the interior 17 of the cup in communication with the atmosphere and thus release the vacuum so that the device may be readily removed.

It will be seen that the operator, by grasping the cap 24, can position the device upon the glass and create the required vacuum to secure it in place in a single operation and that, likewise, after cutting the operator can upon pulling the cap 24 outwardly release the vacuum and at the same time remove the device from the laminated sheet. As shown in Fig. 3, when the suction cup 16 is forced downwardly to engage the laminated sheet the strap 29 is placed slightly under tension so that when the cap 24 is subsequently lifted up to release the vacuum the action of the strap will tend to automatically lift the suction cup from the glass.

Figure 4:
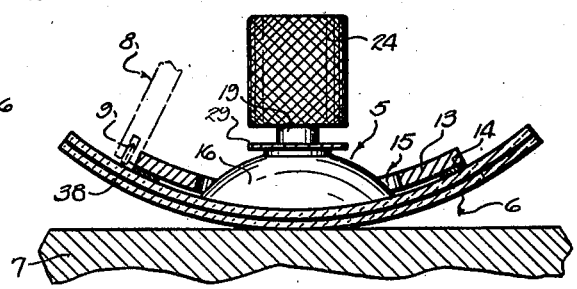
Fig. 4 is a transverse section showing the device associated with the concave surface of the laminated glass sheet.

The device illustrated in Fig. 4 is of the same construction as that shown in Figs. 1, 2 and 3 and described hereinabove; the only difference being that the template or pattern 13 is oppositely curved to permit the cutting of the concave surface of the laminated sheet 6. Ordinarily, it is simply necessary to provide two of the devices as shown in Figs. 2 and 4; one being employed when cutting the convex surface of the laminated sheet and the other when cutting the concave surface thereof.

In actual practice, it is desirable to provide a relatively long sheet of laminated glass 6 having the desired transverse curvature so that a plurality of lenses can be cut therefrom. Thus, the device shown in Fig. 2 can first be employed to cut out the desired number of lenses from the laminated sheet, as indicated at 38, after which the sheet can be reserved and the device illustrated in Fig. 4 employed in cutting the opposite or concave surface of the laminated sheet along lines coinciding with the lines of cut 38 upon the convex surface thereof. Although not essential, it is preferred that after the first glass sheet 10 has been cut it is broken along the score lines, then the glass sheet 11 is cut and broken along its score lines, after which the plastic interlayer 12 is separated to complete the cutting operation.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A device for use in cutting curved sheets of glass, comprising a template acting as a guide for a cutting tool having the desired outline and a curvature approximating the curvature of the glass surface to be cut, said template having an opening therein substantially centrally thereof, and a suction cup carried by said template and arranged within said opening adapted for attachment to the glass sheet to secure the said template in position during the cutting operation.

2. A device for use in cutting curved sheets of glass, comprising a template acting as a guide for a cutting tool having the desired outline and a curvature approximating the curvature of the glass surface to be cut, said template having an opening therein substantially centrally thereof, a suction cup carried by said template and arranged within said opening adapted for attachment to the glass sheet to secure the said template in position during the cutting operation, and means carried by said suction cup for selectively placing the interior of said cup in communication with the atmosphere or for shutting off such communication.

3. A device for use in cutting curved sheets of glass, comprising a template acting as a guide for a cutting tool having the desired outline and a curvature approximating the curvature of the glass surface to be cut, said template having an opening therein substantially centrally thereof, a suction cup carried by said template and arranged within said opening adapted for attachment to the glass sheet to secure said template in position during the cutting operation, said suction cup having a passage communicating with the interior thereof, a stem carried by said cup and provided with a longitudinal opening communicating at its outer end with the atmosphere and at its inner end with the interior of the suction cup through said passage, and a cap mounted upon said stem and adapted when moved inwardly to shut off the communication between the interior of the cup and the atmosphere and when moved outwardly to afford such communication.

4. A device for use in cutting curved sheets of glass, comprising a template acting as a guide for a cutting tool having the desired outline and a curvature approximating the curvature of the glass surface to be cut, said template having an opening therein substantially centrally thereof, a suction cup arranged within said opening adapted for attachment to the glass sheet to secure the said template in position during the cutting operation, and means for connecting said suction cup and template together including a resilient metal strap secured intermediate its ends to the suction cup and at its opposite ends to the template.

5. A device for use in cutting curved sheets of glass, comprising a template acting as a guide for a cutting tool having the desired outline and a curvature approximating the curvature of the glass surface to be cut, said template having an opening therein substantially centrally thereof, a suction cup arranged within said opening adapted for attachment to the glass sheet to secure the said template in position during the cutting operation, means for connecting said suction cup and template together including a resilient metal strap secured intermediate its ends to the suction cup and at its opposite ends to the template, and means carried by said suction cup for placing the interior of said cup in communication with the atmosphere or for shutting off such communication.

6. A device for use in cutting curved sheets of glass, comprising a template acting as a guide for a cutting tool having the desired outline and a curvature approximating the curvature of the glass surface to be cut, said template having an opening therein substantially centrally thereof, a suction cup arranged within said opening adapted for attachment to the glass sheet to secure the said template in position during the cutting operation, means for connecting said suction cup and template together including a resilient metal strap secured intermediate its ends to the suction cup and at its opposite ends to the template, said suction cup having an opening therein, a stem carried by said suction cup and having a longitudinally extending opening therethrough communicating at its outer end with the atmosphere and at its inner end with the interior of the suction cup through said passage, and a cap mounted upon said stem and adapted when moved inwardly to shut off the communication between the interior of the suction cup and the atmosphere and when moved outwardly to afford such communication.

7. A device for use in cutting curved sheets of glass, comprising a template acting as a guide for a cutting tool having the desired outline and a curvature approximating the curvature of the glass surface to be cut, said template having an opening therein approximately centrally thereof, a suction cup arranged within said opening adapted for attachment to the glass sheet to secure said template in position during the cutting operation, said suction cup having a passage therein communicating with the interior thereof, a stem carried by said suction cup and having a longitudinally extending opening therethrough communicating at its outer end with the atmosphere and at its inner end with the interior of the cup through said passage, a cap mounted upon said stem and adapted when moved inwardly to shut off the communication between the interior of the cup and the atmosphere and when moved outwardly to afford such communication, means for connecting said suction cup and template together including a resilient metal strap carried by the suction cup intermediate the ends thereof and provided at its outer ends with slots, and pins carried by said template and having flattened portions received within slots in said metal strap.

8. A device for use in cutting curved sheets of glass, comprising a template acting as a guide for a cutting tool having the desired outline and a curvature approximating the curvature of the glass surface to be cut, said template having an opening therein approximately centrally thereof, a suction cup arranged within said opening adapted for attachment to the glass sheet to secure said template in position during the cutting operation, said suction cup having a passage therein communicating with the interior thereof, a stem carried by said suction cup and having a longitudinally extending opening therethrough communicating at its outer end with the atmosphere and at its inner end with the interior of the cup through said passage, a cap mounted upon said stem and adapted when moved inwardly to shut off the communication between the interior of the cup and the atmosphere and when moved outwardly to afford such communication, means for connecting said suction cup and template together including a resilient metal strap carried by the suction cup intermediate the ends thereof and provided at its outer ends with slots, pins carried by said template and having flattened portions received within slots in said metal strap, and a compression spring encircling said stem and cooperating with the cap to prevent the complete removal of said cap from said stem.

IRVIN F. JOHNSON.